United States Patent Office 3,162,674
Patented Dec. 22, 1964

3,162,674
HYDROXY[DI(POLYFLUOROHALOALKYL)]METH-YLMALONONITRILES, THEIR PREPARATION, AND 1,1-DI(POLYFLUOROHALOALKYL)-2,2-DI-CYANOETHYLENES MADE THEREFROM
William J. Middleton, Wilmington, Del., assignor to E. I. du Pont de Nemours and Company, Wilmington, Del., a corporation of Delaware
No Drawing. Filed June 7, 1962, Ser. No. 200,645
9 Claims. (Cl. 260—464)

This invention relates to, and has as its principal objects provision of, a novel and useful class of fluoroalkyl-substituted cyanoethylenes, novel precursors of these compounds and a method for the preparation of all of the same.

Fluoroalkyl-substituted cyanoethylenes are a new class of organic compounds in which the structural features of cyanocarbon olefins and fluorocarbon olefins are combined. This combination results in useful chemical properties that are traceable to either cyanocarbons or fluorocarbons and also in some unusual specific properties that are narrowly characteristic of specific structures within the class and are entirely unpredictable.

It has now been discovered that the previously unknown 1,1 - di(polyfluorohaloalkyl)-2,2-dicyanoethylenes (II) can be prepared by dehydration of hydroxy[di(polyfluorohaloalkyl)]methylmalononitriles (I), also novel compounds which in turn are prepared by reacting malononitrile with polyfluorohaloalkyl ketones. New products of the invention and the methods of making them are illustrated by the following equations:

(A) 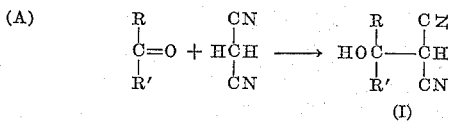

and (B) 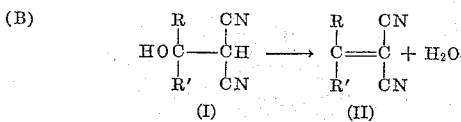

Here Formula I represents the hydroxy[di(polyfluorohaloalkyl)]methylmalononitriles and Formula II represents the 1,1 - di(polyfluorohaloalkyl)-2,2-dicyanoethylenes. In all formulae R and R' are, separately the same or different monovalent polyfluorohaloalkyl groups, including ω-hydroperfluoroalkyl, ω-haloperfluoroalkyl and perfluoroalkyl groups, or, conjointly, a divalent perfluoroalkylene group.

Preferred compounds of the invention are those in which separate R and R' groups have up to 18 carbon atoms or in which conjoined R and R' groups form a perfluoroalkylene group of 3 to 5 carbon atoms. Especially preferred products are those in which separate R and R' groups each contain up to 8 carbon atoms.

As noted in Equation A, the hydroxy[di(polyfluorohaloalkyl)]methylmalononitriles (I) can be prepared, and readily, from malononitrile and polyfluorohaloalkyl ketones. The reaction of the ketone and malononitrile is conveniently carried out in the presence of zinc chloride as catalyst at a temperature in the range of about 50 to about 150° C. The resultant hydroxy compound is usually a crystalline solid which can be isolated and purified in a conventional manner, or which may be used directly (without purification) in the dehydration reaction to form the corresponding 1,1-di(polyfluorohaloalkyl)-2,2-dicyanoethylene.

Dehydration of a hydroxy[di(polyfluorohaloalkyl)] methylmalononitrile (I) as by Equation B is readily accomplished by heating the same, preferably in the presence of a water acceptor, i.e., a substance that will react with or otherwise retain water. A dehydrating agent such as phosphorus pentoxide is of particular advantage as a water acceptor, and with use of such a dehydrating agent the product is conveniently separated as it is formed by distillation from the reaction vessel. Alternatively, the dehydration can be carried out in a vapor phase process in which the vaporized hydroxy compound is passed through a porous layer of a solid water acceptor, e.g., silica gel. The dehydration can also be accomplished by heating the hydroxy compound in the absence of a water acceptor, but since the dehydration reaction is reversible this method of operation is impractical unless an alternative method of separating the water from the ethylenic compound is used, e.g., fractional distillation.

The temperature of dehydration is generally above about 100° C., and when the product is removed by distillation the reaction temperature will be somewhat above the boiling point of the product. However, the temperature of dehydration is not critical and can be quite high, e.g. above 300° C., since the 1,1-di(polyfluorohaloalkyl)-2,2-dicyanoethylene products are thermally stable.

The 1,1-di(fluoroalkyl) - 2,2 - dicyanoethylenes, being ethylenes having a preponderance of highly negative substituents on the carbons attached to the double bond, are relatively strong π-acids that can form colored complexes with aromatic hydrocarbon π-bases. In this property they are like the 1,2-di(fluoroalkyl)-1,2-dicyanoethylenes, new compounds described in U.S. Patent No. 3,133,115 of May 12, 1964. However, unlike the isomeric 1,2-di(fluoroalkyl)-1,2-dicyanoethylenes, the 1,1-di(fluoroalkyl)-2,2-dicyanoethylenes of this invention are additionally and unexpectedly characterized by their readiness to react with activated aromatic nuclei, e.g. the benzene ring in aniline, and to undergo cycloaddition with electron-rich olefinic compounds, e.g., styrene. Furthermore, the 1,1-(difluoroalkyl)-2,2-dicyanoethylenes and the 1,2-(difluoroalkyl)-1,2-dicyanoethylenes are most advantageously prepared by completely different processes.

The invention is illustrated in greater detail in the following examples.

EXAMPLE I

A. *Hydroxy-bis(trifluoromethyl)methylmalononitrile*

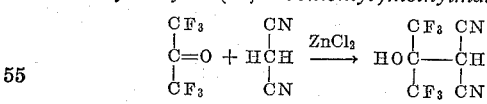

A mixture of 75 g. (1.14 g. mole) of malononitrile, 4 g. (0.03 g. mole) of anhydrous zinc chloride and 150 g. (0.9 g. mole) of hexafluoroacetone was heated in a 240 ml. pressure vessel at 80° C. for 8 hours. An off-white crystalline solid, 211 g., was obtained after the reactor was cooled and vented. A sample of the solid was recrystallized from methylene chloride to give hydroxy-bis(trifluoromethyl)methylmalononitrile as hygroscopic white needles, M.P. 59–70° C.

Anal. for $C_6H_2F_6N_2O$:

|  | C | H | F | N |
|---|---|---|---|---|
| Calc'd | 31.0 | 0.87 | 49.1 | 12.1 |
| Found | 31.5 | 1.00 | 50.1 | 14.4 |

B. *1,1-Bis(Trifluoromethyl)-2,2-Dicyanoethylene*

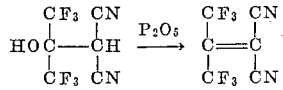

A mixture of 211 g. (0.9 g. mole) of crude hydroxybis(trifluoromethyl)methylmalononitrile, prepared as in Part A from 75 g. of malononitrile and 150 g. of hexafluoroactone, and 454 g. (3.2 g. mole) of phosphorus pentoxide was heated strongly in a 5 liter flask connected to a simple still until no further distillate was collected. The distillate was filtered and redistilled to give 97 g. of 1,1-bis(trifluoromethyl)-2,2-dicyanoethylene: B.P. 107°; $n_D^{25}$ 1.3526; $D_4^{25}$ 1.479. The n-m-r fluorine spectrum contained a single unsplit resonance band. The infrared spectrum contained characterizing absorption bands at 4.45 m$\mu$ (for CN) and 6.1 m$\mu$ (for C=C).

Anal. for $C_6F_6N_2$:

|  | C | F | N |
|---|---|---|---|
| Calc'd | 33.7 | 53.2 | 13.1 |
| Found | 34.0 | 53.5 | 12.8 |

EXAMPLE II

A. *(1-Hydroxyhexafluoro-1-Cyclobutyl)Malononitrile*

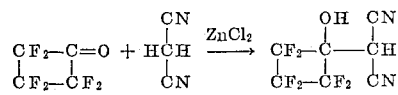

A mixture of malonitrile 14.4 g. (0.02 g. mole) 1 g. (0.007 g. mole) of zinc chloride and 36 g. (0.2 g. mole) of hexafluorocyclobutanone were sealed in a 130 ml. Carius tube and heated to 50° C. for 2 hours. The tube was cooled, opened and vented. The reaction mixture was a fluid semi-solid.

B. *Dicyanomethylenehexafluorocyclobutane*

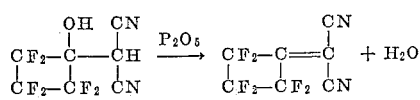

All but a small portion of the product of Part A was mixed with 100 g. (0.7 g. mole) of phosphorus pentoxide and heated strongly in a simple still. The distillate that was collected was redistilled through a fractionating column to give 15.8 g. of dicyanomethylenehexafluorocyclobutane as a colorless liquid: B.P. 117.5° C., $n_D^{25}$ 1.3730. Spectrographic analysis showed an n-m-r fluorine spectrum having 2 resonance bonds in the ratio 2:1 and an infrared spectrum containing characterizing absorption bands at 4.47 m$\mu$ (for CN) and 5.98 m$\mu$ (for C=C).

Anal. for $C_7F_6N_2$:

|  | C | F |
|---|---|---|
| Calc'd | 37.2 | 50.5 |
| Found | 37.2 | 50.3 |

In the manner of the foregoing examples a large number of 1,1-di(polyfluorohaloalkyl)-2,2-dicyanoethylenes can be obtained by reaction of malononitrile with fluoroalkyl ketones and subsequent dehydration of the hydroxy[di(polyfluorohaloalkyl)]methylmalononitriles thus formed. In the following table are listed representative 1,1-di(polyfluorohaloalkyl)-2,2-dicyanoethylenes and the polyfluorohaloalkyl ketones from which they are derived.

TABLE I

| Fluoroalkyl Ketone | 1,1-Di(fluoroalkyl)-2,2-dicyanoethylene |
|---|---|
| Octafluorocyclopentanone | Dicyanomethyleneoctafluorocyclopentane. |
| Decafluorocyclohexanone | Dicyanomethylenedecafluorocyclohexane. |
| Decafluoro-3-pentanone | 1,1-Bis(pentafluoroethyl)-2,2-dicyanoethylene. |
| Decafluoro-2-pentanone | 1-Heptafluoropropyl-1-trifluoromethyl-2,2-dicyanoethylene. |
| Perfluoro-3-decanone | 1-Perfluoroethyl-1-perfluoroheptyl-2,2-dicyanoethylene. |
| Perfluoro-8-pentadecanone | 1,1-Di(perfluoroheptyl)-2,2-dicyanoethylene. |
| Perfluoro-2-nonadecanone | 1-Perfluoromethyl-1-perfluoroheptadecyl-2,2-dicyanoethylene. |
| Perfluoro-18-pentatriacontanone | 1,1-Di(perfluoroheptadecyl)-2,2-dicyanoethylene. |
| 1,3-Dichloro-1,1,3,3-tetrafluoro-2-propanone | 1,1-Bis(chlorodifluoromethyl)-2,2-dicyanoethylene. |
| 1,9-Dichloroperfluoro-5-nonanone | 1,1-Bis(4-chloroperfluorobutyl)-2,2-dicyanoethylene. |
| 1,13-Dichloroperfluoro-7-tridecanone | 1,1-Bis(6-chloroperfluorohexyl)-2,2-dicyanoethylene. |
| 1,3-Dibromo-1,1,3,3-tetrafluoro-2-propanone | 1,1-Bis(bromodifluoromethyl)-2,2-dicyanoethylene. |
| 1H-pentafluoro-2-propanone | 1-Difluoromethyl-1-trifluoromethyl-2,2-dicyanoethylene. |
| 1H,3H-tetrafluoro-2-propanone | 1,1-Bis(difluoromethyl)-2,2-dicyanoethylene. |
| 1H,17H-perfluoro-5-heptadecanone | 1-(4H-perfluorobutyl)-1-(12H-perfluorododecyl)-2,2-dicyanoethylene. |
| 1H,25H-perfluoro-13-pentacosanone | 1,1-Bis(12H-perfluorodecyl)-2,2-dicyanoethylene. |

The 1,1-di(polyfluorohaloalkyl)-2,2-dicyanoethylenes shown in the examples and in Table I have various utilities, some of which are illustrated in Examples A, B and C, below.

EXAMPLE A

The novel 1,1-di(polyfluorohaloalkyl)-2,2-dicyanoethylenes of this invention are $\pi$-acids which form characteristic colored complexes with aromatic compounds (i.e., $\pi$-bases) and thus can be used in the analytical detection and estimation of such compounds. The basis for this use is illustrated in Table II, which shows the wavelength of maximum absorption [$\lambda$ max., cf. Keefer et al., J. Am. Chem. Soc. 72, 4677 (1950)] in methylene chloride of $\pi$-complexes formed by the products of Examples I-B and II-B with representative aromatic hydrocarbon $\pi$-bases.

TABLE II

| $\pi$-Base | $\pi$-Acid | $\lambda$ max., m$\mu$ |
|---|---|---|
| Pyrene | I-B | 500 |
| Do | II-B | 580 |
| Durene | I-B | 386 |
| Do | II-B | 423 |
| Hexamethylbenzene | I-B | 445 |
| Do | II-B | 497 |
| Benzene | I-B | 316 |
| Do | II-B | 334 |
| Toluene | I-B | 327 |
| Do | II-B | 358 |

EXAMPLE B

The 1,1-di(polyfluorohaloalkyl)-2,2-dicyanoethylenes also react readily with activated aromatic nuclei, and thus are useful as intermediates in the preparation of nuclear-substituted aromatic compounds. For example, p-[$\beta,\beta$-dicyano-$\alpha,\alpha$-bis(trifluoromethyl)ethyl]aniline was obtained in the reaction:

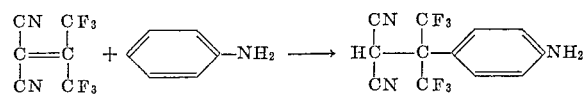

A solution of 0.93 g. (0.01 g. mole) of aniline in 5 ml. of ether was added dropwise to a stirred and cooled solution of 2.14 g. (0.01 g. mole) of 1,1-bis(trifluoromethyl)-2,2-dicyanoethylene in 10 ml. of ether. The reaction mixture was filtered, and the filtrate was evaporated to dryness. The solid residue was recrystallized from hexane to give 1.58 g. of p-[$\beta,\beta$-dicyano-$\alpha,\alpha$-bis(trifluoromethyl)ethyl]aniline as colorless needles, M.P. 107° C.

The product was found to be insoluble in water but soluble in dilute hydrochloric acid or sodium hydroxide. The n-m-r and infrared spectra was consistent with the p-substituted aniline structure.

Anal. for $C_{12}H_7F_6N_3$:

|  | C | H | F | N |
|---|---|---|---|---|
| Calc'd | 46.9 | 2.30 | 37.1 | 13.7 |
| Found | 46.6 | 2.85 | 38.0 | 14.1 |

A solution of 0.1 g. of sodium nitrite in 5 ml. of water was added to a cooled solution of 0.1 g. of the p-[β,β-dicyano-α,α-bis(trifluoromethyl)ethyl]aniline in 5 ml. of dilute hydrochloric acid. β-naphthol, 0.1 g., was then stirred with the reaction product and 5% sodium hydroxide was added until the solution became homogeneous and brilliant orange. A piece of wool fabric was dyed orange by immersing it in the solution for 1 min. and then thoroughly washing it with soap and water.

In this reaction 1,1-bis(trifluoromethyl)-2,2-dicyanoethylene is unpredictably different from the isomeric compound, 1,2-bis(trifluoromethyl)-1,2-dicyanoethylene, since the latter did not react with aniline in the same manner.

EXAMPLE C

Another useful property of the 1,1-di(polyfluorohaloalkyl)-2,2-dicyanoethylenes is their unusual readiness to undergo cycloaddition with electron-rich olefinic compounds to form cyclobutanes. This property is exemplified in the following reactions that have been carried out at low temperature with styrene and α-methylstyrene.

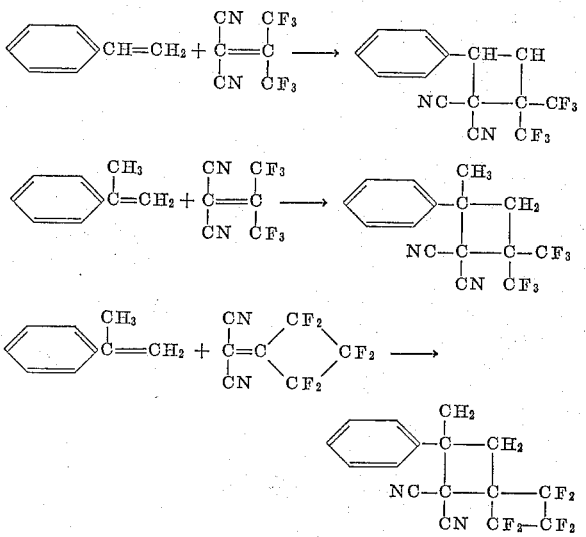

The structures of the cyclobutanes formed is not known with certainty, the illustrated assignments being based on the expected polarization of the olefins and the direction of addition established in their reversible reactions with water. As an example, the reaction of 1,1-bis(trifluoromethyl)-2,2-dicyanoethylene with styrene is detailed as follows:

A solution of 2.08 g. (0.02 g. mole) of styrene in 5 ml. of pentane was added to a solution of 4.28 g. (0.02 g. mole) of 1,1-bis(trifluoromethyl)-2,2-dicyanoethylene in 5 ml. of pentane cooled to 0° C. The deep yellow color that first formed faded rapidly, and the white crystalline precipitate that formed was collected on a filter and washed with pentane. Recrystallization from pentane gave 5.55 g. of 1,1-dicyano-2-phenyl-4,4-bis(trifluoromethyl)cyclobutane as colorless prisms, M.P. 77 to 78° C.

Anal. for $C_{14}H_8F_6N_2$:

|  | C | H | F | N |
|---|---|---|---|---|
| Calc'd | 52.8 | 2.54 | 35.8 | 8.8 |
| Found | 53.9 | 3.01 | 35.2 | 8.4 |

In these reactions with styrene and α-methylstyrene 1,1-bis(trifluoromethyl)-2,2-dicyanoethylene is again unpredictably different from its isomer, 1,2-bis(trifluoromethyl)-1,2-dicyanoethylene, since substitution of the latter for the former in the above-described process produced no evidence of any reaction.

Since obvious modifications and equivalents in the invention will be evident to those skilled in the chemical arts, I propose to be bound solely by the appended claims.

The embodiments of the invention in which an exclusive property or privilege is claimed are defined as follows:

1. 1,1-di(polyfluorohaloalkyl) - 2,2 - dicyanoethylenes having the formula $$\begin{array}{c} R \quad CN \\ | \quad | \\ C=C \\ | \quad | \\ R' \quad CN \end{array}$$

wherein R and R' are selected, individually, from the group consisting of ω-hydroperfluoroalkyl and ω-haloperfluoroalkyl of up to 18 carbons and, jointly, of perfluoroalkylene of between 3 and 5 carbons.

2. 1,1-bis(trifluoromethyl)-2,2-dicyanoethylene.
3. Dicyanomethylenehexafluorocyclobutane.
4. Hydroxy[di(polyfluorohaloalkyl)]methylmalononitriles having the formula $$\begin{array}{c} R \quad CN \\ | \quad | \\ HOC—CH \\ | \quad | \\ R' \quad CN \end{array}$$

wherein R and R' are selected, individually, from the group consisting of ω-hydroperfluoroalkyl and ω-haloperfluoroalkyl of up to 18 carbons and, jointly, of perfluoroalkylene of between 3 and 5 carbons.

5. Hydroxy-bis(trifluoromethyl)methylmalononitrile.
6. (1-hydroxyhexafluoro-1-cyclobutyl)malononitrile.
7. The process of producing a hydroxy[di(polyfluorohaloalkyl)]methylmalononitrile which comprises reacting malononitrile and a polyfluorohaloalkyl ketone at a temperature of about 50–150° C. and in the presence of zinc chloride.
8. The process of producing hydroxy-bis(trifluoromethyl)methylmalononitrile which comprises reacting malononitrile and hexafluoroacetone at a temperature of about 50–150° C. and in the presence of zinc chloride.
9. The process of producing (1-hydroxyhexafluoro-1-cyclobutyl)malononitrile which comprises reacting malononitrile and perfluorocyclobutanone at a temperature of about 50–150° C. and in the presence of zinc chloride.

References Cited in the file of this patent

UNITED STATES PATENTS 2,541,466    Dickey  ---------------- Feb. 13, 1951